(12) United States Patent
Dollo et al.

(10) Patent No.: US 7,751,433 B2
(45) Date of Patent: Jul. 6, 2010

(54) SWITCHING APPARATUS HAVING UNIVERSAL TRANSPORT OF DATA PACKET FRAMES

(75) Inventors: Philippe Dollo, Lannion (FR); Yannick Stephan, Tregastel (FR)

(73) Assignee: Alcatel Lucent, Paris (FR)

( * ) Notice: Subject to any disclaimer, the term of this patent is extended or adjusted under 35 U.S.C. 154(b) by 743 days.

(21) Appl. No.: 11/622,260

(22) Filed: Jan. 11, 2007

(65) Prior Publication Data

US 2007/0160042 A1 Jul. 12, 2007

(30) Foreign Application Priority Data

Jan. 12, 2006 (EP) .................................. 06300028

(51) Int. Cl.
*H04J 3/02* (2006.01)
(52) U.S. Cl. ......................... 370/466; 370/401; 370/389
(58) Field of Classification Search ................. 370/466, 370/401, 389
See application file for complete search history.

(56) References Cited

U.S. PATENT DOCUMENTS

| | | | | |
|---|---|---|---|---|
| 5,896,383 | A * | 4/1999 | Wakeland | 370/400 |
| 6,047,002 | A * | 4/2000 | Hartmann et al. | 370/466 |
| 6,625,169 | B1 * | 9/2003 | Tofano | 370/466 |
| 6,754,227 | B1 | 6/2004 | Petersen | |
| 6,785,730 | B1 * | 8/2004 | Taylor | 709/230 |
| 6,801,544 | B1 * | 10/2004 | Rijckaert et al. | 370/473 |
| 6,944,168 | B2 * | 9/2005 | Paatela et al. | 370/401 |
| 7,072,970 | B2 * | 7/2006 | Georgiou et al. | 709/230 |
| 7,124,333 | B2 * | 10/2006 | Fukushima et al. | 714/701 |
| 7,380,045 | B2 * | 5/2008 | Park et al. | 710/315 |
| 7,408,938 | B1 * | 8/2008 | Chou et al. | 370/394 |
| 7,502,373 | B2 * | 3/2009 | Cote | 370/392 |
| 7,539,195 | B2 * | 5/2009 | Paatela et al. | 370/392 |
| 2003/0058854 | A1 * | 3/2003 | Cote | 370/389 |
| 2005/0053093 | A1 * | 3/2005 | Fukushima et al. | 370/468 |
| 2007/0064737 | A1 * | 3/2007 | Williams | 370/473 |

\* cited by examiner

*Primary Examiner*—Ricky Ngo
*Assistant Examiner*—Ben H Liu
(74) *Attorney, Agent, or Firm*—Carmen Patti Law Group, LLC

(57) ABSTRACT

Apparatus is dedicated to switching data packet frames of different types coming from at least two transport networks that use different transport protocol layers. Said apparatus includes a switching module and at least two access cards, each of which is connected to a respective one of said networks and to said switching module, each access card including processing means that, when they receive a frame coming from a source network to which they are connected and for a destination network, have the tasks of removing from said frame the transport protocol layers that it contains, and then of adding an internal header to the payload data of at least one packet of said frame, prior to transmitting it to said switching module, said internal header comprising at least: a channel identifier field containing a value representative of a channel assigned to the connection used by said frame on being set up; a length field containing a value representative of the number of bytes contained in the packet in question; and a type field containing values representative of characteristics of the payload data of the packet in question.

16 Claims, 2 Drawing Sheets

SWITCHING APPARATUS HAVING UNIVERSAL TRANSPORT OF DATA PACKET FRAMES

Figure 1:
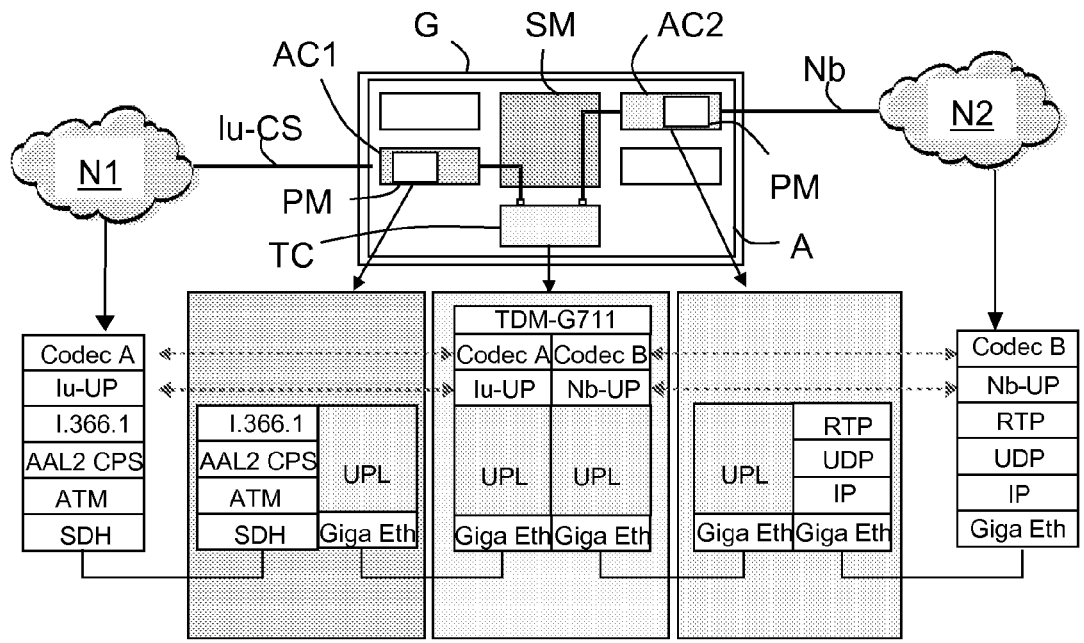

The invention relates to packet transport networks, and more particularly to switching equipment used for switching data packets between packet transport networks of different types.

The term "switching equipment" is used herein to mean any network equipment having the task of switching packets of different types, such as, for example, automatic exchanges (such as E10 type exchanges) or media/voice gateways (or Media Gateways (MGWs), or switching equipment used in Base Station Controllers (BSCs) or in Radio Network Controllers (RNCs), or in nodes of the Serving GPRS (General Packet Radio Service) Support Node (SGSN) type or of the Gateway GPRS Support Node (GGSN) type, for switching packets between networks of different types, such as, in particular Asynchronous Transfer Mode (ATM), $3^{rd}$ Generation Partnership Project (3GPP) ATM, Internet Protocol (IP), and 3GPP IP networks.

As is known to the person skilled in the art, each type of transport network has its own stacks (or layers) of protocols for transporting data packets. For example, in a conventional voice/media gateway (or MGW), the packets that are received via an access card (or input card) are transferred to another access card (or output card) via a link module performing a frame format adaptation function. The link module is, for example, a digital processing card that also performs a necessary encapsulation adaptation function.

In most voice/media gateways (or MGWs), some of the layers of the transport core, such as, for example, the layers of the Real-time Transport Protocol (RTP) in the case of an IP network, are terminated in a digital processing card (e.g. a processor of the Digital Signal Processor (DSP) type). Unfortunately the resources of the DSP are limited and use of them is, in principle reserved for high-added-value processing, such as, for example, voice compression. In addition, in the absence of packets to be modified, the link module merely adds or drops the transport layers in question, thereby increasing the complexity of managing the connections and the overall latency (or waiting time) of the connections, requiring higher processing capacities, and increasing the cost of the switching equipment.

Admittedly, connection-oriented internal transport mechanisms have been proposed. But the corresponding agnostic encapsulation mechanisms have not yet been created.

Document U.S. Pat. No. 6,754,227 describes a gateway for interconnecting networks of different types, but that gateway makes it possible to transport packets that are of fixed length only. It uses an internal transport structure of the ATM/AAL2 (ATM/ATM Adaptation Layer type 2) type that has no explicit indication on the structure of the payload data transported in that internal transport structure.

Document U.S. Pat. No. 6,625,169 describes a gateway for interconnecting networks of different types that fully decodes the payload data in order to adapt it prior to encapsulating it in a "universal" transport format.

Since no known solution is fully satisfactory, an object of the invention is thus to improve the situation.

To this end, the invention provides apparatus that is dedicated to switching data packet frames of different types coming from at least two transport networks that use different transport protocol layers, said apparatus comprising a switching module and at least two access cards, each of which is connected to a respective one of the networks and to the switching module.

This switching apparatus is characterized by the fact that each of its access cards includes processing means that, each time they receive a frame coming from a source network to which they are connected and for a destination network, have the task of removing from said frame the transport protocol layers that it contains, and then of adding an internal header to the payload data of at least one packet of said frame (prior to transmitting it to said switching module), said internal header comprising at least:

a channel identifier field containing a value representative of a channel assigned to the connection used by said frame on being set up;
a length field containing a value representative of the number of bytes contained in the packet in question; and
a type field containing values representative of characteristics of the payload data of the packet in question.

The apparatus characterized in this way makes it possible, by means of the length field and of the type field of the internal header, to identify explicitly the payload data transported, thereby offering the advantage of simplifying the operations necessary for adapting transport formats (IP, ATM, etc.).

The apparatus of the invention may have other characteristics that can be taken separately or in combination, and in particular:

its processing means may have the task of integrating into each internal header a sequence field containing a value representative of a time interval between packets and of a sequence number of the packet to which said internal header is added;
its processing means may have the task of integrating into each internal header an aggregation field containing a value indicating whether said packet is the last in the packet in question;
its processing means may have the task of adding an internal header to each packet contained in a frame;
its processing means may; when they receive a frame coming from said switching module and including at least one internal header, have the tasks of removing from said frame said internal header that it contains, and then of adding to said frame transport protocol layers that are chosen as a function of the values of the fields of each internal header and as a function of said destination network, prior to transmitting it over the connection defined by the value of the channel identifier field of said internal header;
the apparatus may further comprise a transcoder card connected to said switching module and, when it receives a frame coming from an access card, via said switching module, and for another access card, and including at least one internal header added to at least on payload data packet presenting first coding, having the tasks of converting said first coding of the payload data into second coding, and then of transmitting said frame to said switching module in order to transmit it to said other access card;
when no coding conversion is to be performed, the switching module may have the task of causing each frame including at least one added internal header to transit via said transcoder card, during a preliminary protocol negotiation phase;
the characteristics of the payload data of a packet are, for example, chosen from among a group comprising at least the type of coding, the mode of coding for a type of coding in question, the packet time for the packet in question, the type of payload data of the packet in question, and the type of the source network.

The invention also provides network equipment for at least two transport networks that use different transport protocol layers, said network equipment including switching apparatus of the above-described type.

For example, said equipment is in the form of a voice/media gateway (or MGW), of a base station controller, of an SGSN-type node, or of a GGSN-type node.

The invention is particularly, though not exclusively, suited to situations in which switching equipment is connected to at least two transport networks of the ATM and IP types.

Figure 2:
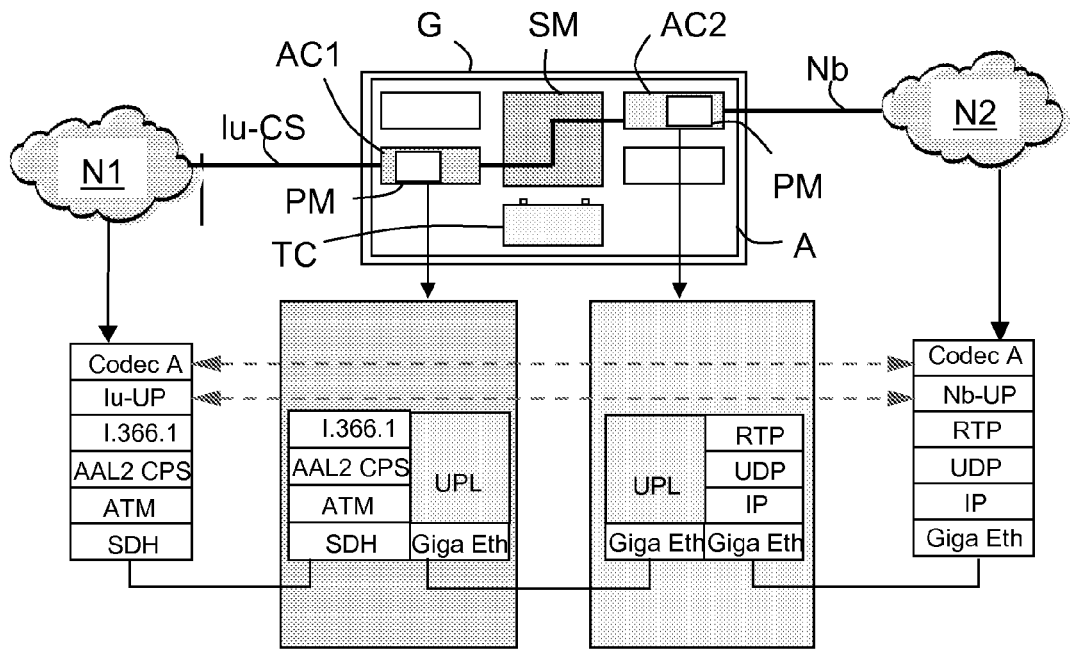
Figure 3:
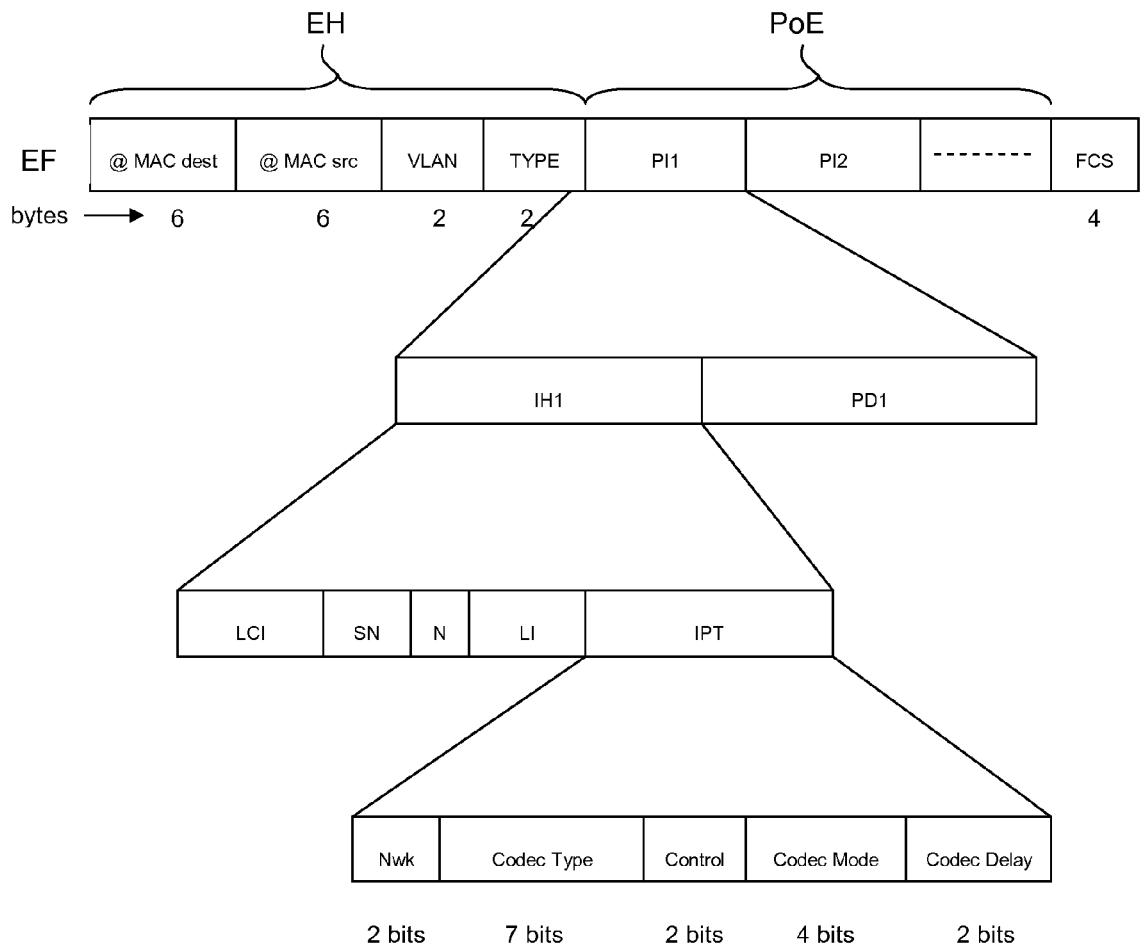

Other characteristics and advantages of the invention will appear on examining the following detailed description and the accompanying drawings, in which:

FIG. 1 is a block diagram showing an example of a media/voice gateway equipped with switching apparatus of the invention and coupled to ATM and IP networks, in the case of voice coding conversion and/or during a preliminary protocol negotiation phase;

FIG. 2 is a block diagram of a media/voice gateway equipped with switching apparatus of the invention and coupled to ATM and IP networks, in the absence of voice coding conversion (and after the preliminary protocol negotiation phase); and FIG. 3 is a diagram of aggregation of internal packets over Ethernet, each packet including an internal header of the invention and being encapsulated in an Ethernet frame.

The accompanying drawings can serve not only to supplement the description of the invention, but also to contribute to defining the invention.

An object of the invention is to enable data packet frames to be transported universally in frame switching equipment connected to at least two transport networks of different types.

In the description below, it is assumed by way of non-limiting example, that the switching equipment is connected to two transport networks only, namely an ATM-type network (N1), and an IP-type network (N2) such as, for example, a 3GPP IP mobile network. The switching equipment (G) is then a voice/media gateway (or Media Gateway (MGW)) having an Ethernet switch (SM).

But the invention is not limited to those types of transport network and of switching equipment. It relates to all packet transport networks, and, in particular to networks known by the acronyms ATM, 3GPP ATM, IP, 3GPP IP, MPLS (Multi-Protocol Label Switching), and GMPLS (Generalized MPLS), and to all switching equipment, Ethernet or otherwise, that is capable of switching packets of different types, and in particular automatic exchanges (such as exchanges of the E10 type), voice/media gateways (MGWs), BSCs or RNCs, and nodes of the SGSN or GGSN types.

In the examples shown in FIGS. 1 and 2, the switching equipment G (of the MGW type in this example) is connected by way of illustrative example firstly to a Universal Mobile Telecommunications System (UMTS) Terrestrial Radio Access Network (UTRAN) of the ATM network N1, via an interface of the of the Iu-CS (Iu-Circuit Switched) type, and secondly to a 3GPP IP Public Land Mobile Network (PLMN) mobile radio access network of the IP network N2, via an Nb type interface.

More precisely, the switching equipment G comprises a first access card AC1, of the ATM type, connected to the ATM network N1, a second access card AC2 of the IP type, connected to the IP network N2, a switching module SM connected to the first and second access cards AC1, AC2, and a transcoder card TC connected to the switching module SM.

The first access card AC1 receives from the ATM network N1 frames containing AAL2 on ATM cells, whose contents include payload data (PD) for the IP network N2, and thus the transport protocol layers that are used by the network N1. In the example shown in FIGS. 1 and 2, the transport protocol layers used by the ATM network N1 are 1.366.1 (or 1.366.2 in an application different from the application shown), AAL2 Common Part Sublayer (CPS), ATM, and Synchronous Digital Hierarchy (SDH).

The second access card AC2 receives from the IP network N2 Ethernet frames that are for the ATM network N1 and that contain data packets that are encapsulated on IP, and thus the transport protocol layers that are used by the network N2. In the example shown in FIGS. 1 and 2, the transport protocol layers used by the IP network N2 are RTP, User Datagram Protocol (UDP), IP, and Giga Ethernet.

The switching module SM has the task of switching the frames (EFs) that it receives from one of the first and second access cards AC1 or AC2 to the other access card AC2 or AC1, optionally via the transcoder card TC.

The transcoder card TC has the task of taking the data that is contained in the packets of the frames (EFs) it receives from the switching module SM, and of converting that data which is coded using first coding (CODEC A) into data coded using second coding (CODEC B) and of converting that data which is coded using said second coding (CODEC B) into data coded using said first coding (CODEC A).

It should be noted that, when the data is coded, but is not to undergo coding conversion (because both networks N1 and N2 use the same CODEC), the transcoder card TC nevertheless receives the frames (EFs) during the preliminary protocol negotiation phase because it is the transcoder card that terminates the Iu layer and thus that negotiates the parameters of the Iu protocol for managing data transport (and then it no longer acts, except in certain special cases, such as, for example, for inserting announcements).

In accordance with the invention, each access card AC1, AC2 includes a processing module PM that firstly has the task of removing the transport protocol layers that are contained in the frames that come from the (source) network N1 or N2 to which it is connected and that are for the (destination) network N2 or N1. In this way, each access card AC1, AC2 constitutes the place of "termination" of the transport protocol layers of the network to which it is connected.

For example, when the first access card AC1 receives a frame from the ATM network N1, its processing module PM removes (in this example) the 1.366.1 (or 1.366.2), AAL2 CPS, ATM and SDH layers. Similarly, when the second access card AC2 receives an (Ethernet) frame from the IP network N2, its processing module PM removes (in this example) the RTP, UDP, IP and Giga Ethernet layers.

Each processing module MP also has the task, once it has removed the transport protocol layers from a received frame, of adding a special internal header IH to the payload data PD of at least one packet of said fame so as to constitute a "universal" frame EF. It should be noted that a universal frame EF can contain either a single packet or an aggregation of at least two packets. In which case, it is preferably for an internal header IH of the invention to be added to each universal frame packet.

The term "internal packet" or "PI" PIi (i>0) is used to designate a packet of a universal frame EF to which an internal header IH of the invention has been added, after the transport protocol layers have been extracted.

An internal header IH contains all of the information necessary for the recipient to identify the characteristics of the data of at least one packet contained in a universal frame EF. Such information is deduced from the information that is contained in some of the transport protocol layers.

Each internal header IH is inserted into a universal frame EF immediately before the corresponding payload data PD, without any specific processing.

In accordance with the invention, each internal header IH comprises at least three fields and preferably four, or even five fields, as shown in FIG. 3.

A Logical Channel Identifier (LCI) field or "channel identifier field" contains a value (or an identifier) that is representative of the channel that was assigned to the connection used by its universal frame EF on being set up. Said value is used by the access card that is connected to the destination network for the purpose of retrieving the context of the connection channel that it should use internally for transmitting the frame to the network to which it is connected. For example, the value of the LCI field is coded by 18 bits.

A Length Identifier (LI) field or "length field" contains a value representative of the number of bytes contained by the internal packet PIi of which it is part, excluding the internal header IH. In other words, the value of the LI field represents the number of bytes that define the payload data PD of the packet initially received, and to which the internal header IH has been added. For example, the value of the LI field is coded by 11 bits.

An Incoming Payload Table (IPT) field or "type field" contains values representative of the characteristics of the payload data PD of the internal packet PIi of which it is part in a universal frame EF, which characteristics are necessary for the access card connected to the destination network in order to re-form a conventional frame.

The characteristics that are concerned by the IPT type field vary depending on the types of the transport networks and on the types of the payload data PD of the packets. For example, when transporting voice data between an ATM-type network N1 and an IP-type network N2, the characteristics are chosen from among the type of coding (CODEC), the mode of coding for a type of coding (CODEC) in question, the packet time or indeed the packetization time of the packet in question (i.e. the time required for forming a packet, as a function of the sampling clock), the type of payload data PD of the packet in question, and the type of the source network.

In the non-limiting example shown in FIG. 3, the IPT type field contains all of the above-mentioned characteristics in different subfields:

"Nwk" is the type of source network (e.g. it is coded on 2 bits when only two networks are present);

"Codec Type" is the type of coding (e.g. CODEC A or CODEC B—e.g. it is coded on 7 bits);

"Control" is the type of the payload data PD of the packet in question (e.g. it is coded on 2 bits—e.g. the value 00 designates normal payload data whereas 01 designates zero payload data);

"Codec Mode" is the mode of coding for the type of coding defined by the Codec Type field (e.g. the mode of coding is equal to 16 kilobits per second for the G726 type of coding—e.g. it is coded on 4 bits); and "Codec Delay" is the packet time of the packet in question (e.g. 10 milliseconds (ms) or 20 ms—e.g. it is coded on 2 bits).

A first additional field or Sequence Number (SN) field, also referred to as the "sequence field" can, for example contain a value representative of the interval of time between packets and of the sequence number of the internal packet PIi of which it is part. This value makes it possible to check the sequencing of the packets and the time interval between packets, and thus to implement a mechanism for detecting packet loss(es).

A second additional field N, or "aggregation field", can, for example contain a value indicating whether the internal packet PIi of which it is part is the last packet of the universal frame EF. The aggregation field N makes it possible to aggregate a plurality of packets in the same universal frame EF so as to increase the passband in the switching equipment P. For example, the value of the field N is coded by 1 bit.

As shown in FIG. 3, a universal frame EF that is transmitted by an access card AC1, AC2 to the switching module SM is thus constituted by:

an Ethernet header EH conventionally having a destination Medium Access Control (MAC) address field or ("@MACdest"), a source MAC address field ("@MACsrc"), a field identifying a Virtual Local Area Network ("VLAN"), and a field identifying the type of encapsulation of the packets "TYPE", e.g. Packet over Ethernet Frame;

at least a first internal packet PI1 constituted by an internal header IH1 and by the payload data PD1 contained in the first packet of the initially received frame (prior to processing by the processing module PM);

any second internal packet PI2 constituted by an internal header (IH2) and by payload data (PD2) contained in the second packet of the initially received frame (prior to processing by the processing module PM);

one or more other internal packets PIi (i>2); and a Frame Check Sequence (FCS) field for checking the structural integrity of the frame.

In FIG. 3, that portion of the universal frame EF which is dedicated to the internal packets PIi is referenced PoE.

What the switching module SM does to the universal frames EFs that it receives from an access card AC1, AC2 depends on at least two parameters: need for coding conversion and the transmission phase.

When in a preliminary protocol negotiation phase, the switching module SM addresses the received universal frame EF to the transcoder card TC, regardless of whether or not coding conversion is necessary. The transcoder card TC then negotiates the parameters for management of the Iu protocol, and then sends the universal frame EF back to the switching module SM which then switches it to the access card that is connected to the destination network.

When not in a preliminary protocol negotiation phase, but when coding conversion is necessary (e.g. from CODEC A to CODEC B), the switching module SM addresses the received universal frame EF to the transcoder card TC. The transcoder card TC performs the coding conversion on the payload data PD contained in each internal packet PIi of the universal frame EF, and then sends the converted universal frame EF back to the switching module SM which then switches it to the access card that is connected to the destination network. This situation is shown diagrammatically in FIG. 1.

The transcoder card TC knows each coding used by each network to which its switching apparatus A is connected. Therefore, when it receives a universal frame EF, it reads the field defining the coding of the data (e.g. CODEC A), and then it determines internally which coding is used by the destination network (e.g. CODEC B), and it then performs the conversion (e.g. from CODEC A to CODEC B).

Similarly, the transcoder card TC knows each type of interface used for connecting its switching apparatus A to the transport networks. Therefore, when it receives a universal frame EF, it reads the field defining the type of connection interface for connection to the source network (e.g. Iu in the ATM network N1), then it determines internally the type of connection interface for connection to the destination network (e.g. Nb for the IP network N2), and it replaces the field defining the type of connection interface (e.g. Iu-UP is changed for Nb-UP).

When not in the preliminary protocol negotiation phase and when no coding conversion is necessary, the switching module SM switches the universal frame EF directly to the access card that is connected to the destination network. This situation is shown diagrammatically in FIG. 2.

When an access card AC1, AC2 receives a universal frame EF from the switching module SM, its processing module PM firstly starts by removing each internal header IHi from said frame EF, and more precisely from each of its internal packets PIi. Then, it determines which transport protocol layers should be added to the resulting frame as a function of the values of the fields of each removed internal header IHi and as a function of the destination network (e.g. N2 (or N1)).

In the examples shown in FIGS. 1 and 2, when it is the first access card AC1 that receives a universal frame EF, it must add to the resulting frame that is for the ATM network N1 the transport protocol layers 1.366.1 (or 1.366.2), AAL2 CPS, ATM and SDH. Similarly, when it is the second access card AC2 that receives a universal frame EF, it must add to the resulting Ethernet frame that is for the IP network N2 the transport protocol layers RTP, UDP, IP and Giga Ethernet.

Once the processing module PM of an access card AC1, AC2 has determined the transport protocol layers, it integrates them into the frame so that they are transmitted to the destination network N1, N2 over the connection that is defined by the value of the channel identifier field of the previously removed internal header IHi.

The switching apparatus A of the invention, and in particular the processing module PM of its access cards and its optional transcoder card TC can be implemented in the form of electronic circuits, of software (or computer) modules, or of a combination of circuits and of software.

By means of the invention, the overall performance of the switching equipment G is significantly improved, and the cost per input/output port of the switching equipment G can be reduced significantly. Furthermore, the invention makes it possible to use transcoder cards TC that are independent of the transport interfaces and thus of the transport protocols used by the transport networks. In addition, the universal transport of frames in the switching equipment G satisfies the conditions required by direct switching of frames without transcoding or "TrFO" (Transcoder-Free Operation).

The invention is not limited to the embodiments of the switching apparatus and of the network equipment that are described above merely by way of example, but rather it covers any variants that might be devised by the person skilled in the art within the ambit of the following claims.

The invention claimed is:

1. An apparatus for switching data packet frames of different types coming from at least two transport networks that use different transport protocol layers, said apparatus comprising:
    a switching module;
    at least two access cards,
        each of which is connected to a respective one of said networks and to said switching module,
        each access card including processing means arranged so that, on receiving a frame coming from a source network to which they are connected and for a destination network, they remove from said frame the transport protocol layers that it contains;
    said apparatus being characterized in that it further comprises means for adding an internal header to the payload data of at least one packet of said frame, prior to transmitting it to said switching module,
        said internal header comprising at least i) a channel identifier field containing a value representative of a channel assigned to the connection used by said frame on being set up, ii) a length field containing a value representative of the number of bytes contained in said packet, and iii) a type field containing values representative of characteristics of the payload data of said packet; and
    a transcoder card connected to said switching module and arranged so that, on receiving a frame coming from an access card, via said switching module, and for another access card, and including at least one internal header added to at least one payload data packet presenting first coding, it converts said first coding of the payload data into second coding, and then it transmits said frame to said switching module in order to transmit it to said other access card.

2. Apparatus according to claim 1, characterized in that said processing means are arranged so as to integrate into each internal header a sequence field containing a value representative of a time interval between packets and of a sequence number of the packet to which said internal header is added.

3. Apparatus according to claim 1, characterized in that said processing means are arranged so as to integrate into each internal header an aggregation field containing a value indicating whether said packet is the last in a sequence of related packets.

4. Apparatus according to claim 1, characterized in that said processing means are arranged so as to add an internal header to each packet contained in a frame.

5. Apparatus according to claim 1, characterized in that said processing means are arranged so that, on receiving a frame coming from said switching module and including at least one internal header, they remove from said frame said internal header that it contains, and they then add to said frame transport protocol layers that are chosen as a function of the values of the fields of said internal header and as a function of said destination network, prior to transmitting it over the connection defined by the value of the channel identifier field of said internal header.

6. Apparatus according to claim 1, characterized in that said switching module is arranged so that, when no coding conversion is to be performed, it causes each frame including at least one added internal header to transit via said transcoder card, during a preliminary protocol negotiation phase.

7. Apparatus according to claim 1, characterized in that said switching module is arranged so that, when no coding conversion is to be performed, it switches a frame directly without causing it to transit via said transcoder card, outside any preliminary protocol negotiation phase.

8. Apparatus according to claim 1, characterized in that said characteristics of the payload data of a packet are chosen from among a group comprising at least a type of coding of the payload data, a mode of coding for a type of coding in question, a packet time for the packet in question, a type of payload data of the packet in question, and a type of source network.

9. Network equipment for at least two transport networks that use different transport protocol layers, said network equipment comprising:
    a switching apparatus having capability of switching data packet frames of different types coming from at least two transport networks that use different transport protocol layers, said apparatus comprising:

a switching module;

at least two access cards, each of which is connected to a respective one of said networks and to said switching module, each access card including processing means arranged so that, on receiving a frame coming from a source network to which they are connected and for a destination network, they remove from said frame the transport protocol layers that it contains;

said apparatus being characterized in that it further comprises means for adding an internal header to the payload data of at least one packet of said frame, prior to transmitting it to said switching module, said internal header comprising at least a channel identifier field containing a value representative of a channel assigned to the connection used by said frame on being set up, a length field containing a value representative of the number of bytes contained in said packet, and a type field containing values representative of characteristics of the payload data of said packet; and a transcoder card connected to said switching module and arranged so that, on receiving a frame coming from an access card, via said switching module, and for another access card, and including at least one internal header added to at least one payload data packet presenting first coding, it converts said first coding of the payload data into second coding, and then it transmits said frame to said switching module in order to transmit it to said other access card.

10. Equipment according to claim 9, characterized in that it is chosen from a group comprising at least a voice/media gateway, a base station controller, an SGSN-type node, and a GGSN-type node.

11. An apparatus for switching data packet frames of different types coining from at least two transport networks that use different transport protocol layers, said apparatus comprising:

a switching module;

at least two access cards, each of which is connected to a respective one of said networks and to said switching module, each access card including processing means arranged so that, on receiving a frame coming from a source network to which they are connected and for a destination network, they remove from said frame the transport protocol layers that it contains;

said apparatus being characterized in that it further comprises means for adding an internal header to the payload data of at least one packet of said frame, prior to transmitting it to said switching module, said internal header comprising a channel identifier field containing a value representative of a channel assigned to the connection used by said frame on being set up, a length field containing a value representative of the number of bytes contained in said packet, and a type field containing values representative of characteristics of the payload data of said packet; and a transcoder card connected to said switching module and arranged so that, on receiving a frame coming from an access card, via said switching module, and for another access card, and including at least one internal header added to at least one payload data packet presenting first coding, it converts said first coding of the payload data into second coding, and then it transmits said frame to said switching module in order to transmit it to said other access card, wherein said switching module is arranged so that, when no coding conversion is to be performed, it causes each frame including at least one added internal header to transit via said transcoder card, during a preliminary protocol negotiation phase and wherein said switching module is arranged so that, when no coding conversion is to be performed, it switches a frame directly without causing it to transit via said transcoder card, outside any preliminary protocol negotiation phase.

12. Apparatus according to claim 11, characterized in that said processing means are arranged so as to integrate into each internal header a sequence field containing a value representative of a time interval between packets and of a sequence number of the packet to which said internal header is added.

13. Apparatus according to claim 11, characterized in that said processing means are arranged so as to integrate into each internal header an aggregation field containing a value indicating whether said packet is the last in said packet in question.

14. Apparatus according to claim 11, characterized in that said processing means are arranged so as to add an internal header to each packet contained in a frame.

15. Apparatus according to claim 11, characterized in that said processing means are arranged so that, on receiving a frame coming from said switching module and including at least one internal header, they remove from said frame said internal header that it contains, and they then add to said frame transport protocol layers that are chosen as a function of the values of the fields of said internal header and as a function of said destination network, prior to transmitting it over the connection defined by the value of the channel identifier field of said internal header.

16. Apparatus according to claim 11, characterized in that said characteristics of the payload data of a packet are chosen from among a group comprising at least a type of coding of the payload data, a mode of coding for a type of coding in question, a packet time for the packet in question, a type of payload data of the packet in question, and a type of source network.

* * * * *